(12) United States Patent
Mutisya et al.

(10) Patent No.: US 8,732,693 B2
(45) Date of Patent: May 20, 2014

(54) MANAGING CONTINUOUS SOFTWARE DEPLOYMENT

(75) Inventors: Hillary Mucheru Mutisya, Seattle, WA (US); Benjamin W. Goldsmith, Seattle, WA (US); Edward Griffin Sheppard, III, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 13/197,794

(22) Filed: Aug. 4, 2011

(65) Prior Publication Data

US 2013/0036328 A1     Feb. 7, 2013

(51) Int. Cl.
*G06F 9/445*     (2006.01)
*G06F 9/44*      (2006.01)

(52) U.S. Cl.
USPC ............................ 717/176; 717/172; 717/168

(58) Field of Classification Search
None
See application file for complete search history.

(56) References Cited

U.S. PATENT DOCUMENTS

| | | | |
|---|---|---|---|
| 6,438,749 B1 | 8/2002 | Chamberlain | |
| 6,785,721 B1 | 8/2004 | Immerman et al. | |
| 6,980,521 B1 | 12/2005 | Jarvis | |
| 7,210,143 B2 | 4/2007 | Or et al. | |
| 7,630,877 B2 | 12/2009 | Brown et al. | |
| 7,657,887 B2 | 2/2010 | Kothandaraman et al. | |
| 7,757,226 B2 | 7/2010 | Srivastava et al. | |
| 7,840,961 B1 | 11/2010 | Weathersby | |
| 8,205,194 B2* | 6/2012 | Fries et al. | 717/172 |
| 8,307,437 B2* | 11/2012 | Sebes et al. | 717/172 |
| 8,429,639 B2* | 4/2013 | Jirka | 717/168 |
| 2003/0130985 A1 | 7/2003 | Driesen et al. | |
| 2004/0225952 A1 | 11/2004 | Brown et al. | |
| 2005/0251523 A1 | 11/2005 | Rajamani et al. | |
| 2005/0262503 A1 | 11/2005 | Kane et al. | |
| 2006/0253848 A1* | 11/2006 | Mathieu et al. | 717/168 |
| 2008/0028218 A1 | 1/2008 | Simon | |
| 2008/0098046 A1 | 4/2008 | Alpem et al. | |
| 2008/0276234 A1 | 11/2008 | Taylor et al. | |
| 2009/0217163 A1 | 8/2009 | Jaroker | |
| 2009/0265425 A1 | 10/2009 | Lipscomb et al. | |

(Continued)

OTHER PUBLICATIONS

Meng, X., Pappas, V., & Zhang, L., Improving the scalability of data center networks with traffic-aware virtual machine placement, [Online] Mar. 2010, In INFOCOM, Proceedings IEEE, [Retrieved from the Internet] <http://ieeexplore.ieee.org/stamp/stamp.jsp?tp=&arnumber=5461930> pp. 1-9.*

(Continued)

*Primary Examiner* — Thuy Dao
*Assistant Examiner* — Ravi K Sinha
(74) *Attorney, Agent, or Firm* — Steve Crocker; Jim Ross; Micky Minhas

(57) ABSTRACT

Concepts and technologies are described herein for managing continuous software deployment. A deployment controller can manage deployment of code to a data center. The deployment controller can execute workflows for checking in, verifying, deploying the code, or other processes. The code can be deployed using a differencing disk that includes data indicating changes between software hosted by the data center and a version of software resulting from deployment of the code. The differencing disk can be linked to the disk or virtual resource hosting the software and executed collectively to provide an updated version of the software. Traffic to one or more virtual machines of the data center can be controlled by the deployment controller. If errors are detecting during deployment or after updating, the update can be rolled back.

13 Claims, 8 Drawing Sheets

(56) References Cited

U.S. PATENT DOCUMENTS

| | | | |
|---|---|---|---|
| 2009/0300057 A1 | 12/2009 | Friedman | |
| 2009/0300151 A1* | 12/2009 | Friedman et al. | 709/222 |
| 2010/0058319 A1* | 3/2010 | Kawaguchi et al. | 717/172 |
| 2010/0088281 A1 | 4/2010 | Driesen et al. | |
| 2010/0185827 A1 | 7/2010 | Lowery | |
| 2010/0192143 A1* | 7/2010 | Ingle et al. | 717/172 |
| 2010/0205594 A1* | 8/2010 | Jirka | 717/168 |
| 2010/0223378 A1 | 9/2010 | Wei | |
| 2010/0281456 A1 | 11/2010 | Eizenman et al. | |
| 2011/0004735 A1* | 1/2011 | Arroyo et al. | 717/176 |
| 2011/0016461 A1 | 1/2011 | Bankston et al. | |
| 2011/0061046 A1* | 3/2011 | Phillips | 717/176 |
| 2011/0126197 A1* | 5/2011 | Larsen et al. | 717/176 |
| 2011/0161952 A1* | 6/2011 | Poddar et al. | 717/173 |
| 2011/0296403 A1* | 12/2011 | Janzen | 717/176 |
| 2012/0089972 A1* | 4/2012 | Scheidel et al. | 717/168 |
| 2012/0304175 A1* | 11/2012 | Damola et al. | 718/1 |
| 2013/0036237 A1 | 2/2013 | Mutisya et al. | |
| 2013/0036402 A1 | 2/2013 | Mutisya et al. | |

OTHER PUBLICATIONS

Jay Munro, Virtual Machines & VMware, Part I., [Online] Dec. 21 2001, [Retrieved from the Internet] <http://atlas.binus.ac.id/PDC/EasWeb2.nsf/0/d6f02e9dba8b088247256bf7001f3bd3/$FILE/Virtual%200Machines%20_VMware.pdf> 21 pages.*

Sangameshwar Patil, Guruprasad Aphale, Ankit Mehrotra, Harrick Vin, and Rahul Kelkar, Run-time dependency tracking in data centers, [Online] 2010, In Proceedings of the Third Annual ACM Bangalore Conference (COMPUTE '10) ACM, New York, NY, USA, Article 5, [Retrieved from the Internet] <http://doi.acm.org/10.1145/1754288.1754293> 6 pages.*

Aguiar, César S., et al., The application of distributed virtual machines for enterprise computer management: a two-tier network file system for image provisioning and management, [Online] 2008, 32nd Annual IEEE International, [Retrieved from the Internet] <http://ieeexplore.ieee.org/stamp/stamp.jsp> pp. 428-431.*

U.S. Official Action dated Feb. 11, 2013 in U.S. Appl. No. 13/197,772.

U.S. Official Action dated Apr. 2, 2013 in U.S. Appl. No. 13/198,728.

Yeung, Andrew., "From Development to Production: Streamlining SharePoint Deployment with DocAve® Deployment Manager", Retrieved at <<http://www.avepoint.com/assets/pdf/sharepoint_whitepapers/DocAve_Deployment_Manager_Technical_White_Paper.pdf>>, Technical White Paper, Mar. 2009, pp. 22.

"Introduction to Content Types", Retrieved at <<http://msdn.microsoft.com/en-us/library/ms472236.aspx>>, May 2010, pp. 3.

"List Template", Retrieved at <<http://msdn.microsoft.com/en-us/library/ms434306.aspx>>, May 2010, pp. 2.

"Site Types: WebTemplates and Site Definitions", Retrieved at <<http://msdn.microsoft.com/en-us/library/ms434313.aspx>>, May 2010, pp. 3.

"Using the Change Log", Retrieved at <<http://msdn.microsoft.com/en-us/library/bb447511.aspx>>, May 2010, pp. 2.

Anderson, Tim., "VS2010: Lifecycle Management", Retrieved at <<http://www.softwareknowhow.info/Buyers-Guide/VS2010:-Lifecycle-Management/82>>, Visual Studio 2010, Issue 47, Jan. 2, 2010, pp. 3.

"Great Tools, Great Testers, Great Software.", Retrieved at <<http://www.microsoft.com/india/msidc/servertools/vstb.aspx>>, Retrieved Date: Mar. 18, 2011, pp. 2.

Petri, Daniel., "Creating Differencing Disks with Microsoft Virtual PC", Retrieved at <<http://www.petri.co.il/virtual_creating_differencing_disks_with.htm>>, Jan. 8, 2009, pp. 5.

"Build and Deploy Continuously", Retrieved at <<http://msdn.microsoft.com/en-us/library/ee308011.aspx>>, Retrieved Date: Mar. 17, 2011, pp. 6.

"Electric Cloud Integrates with VMware Lab Manager to Deliver Virtualized Build and Test Automation", Retrieved at <<http://buildguru.com/news/2007-1107b.php>>, Nov. 7, 2007, pp. 2.

"Using Differencing Disks", Retrieved at <<http://technet.microsoft.com/en-us/library/cc720381%28WS.10%29.aspx>>, Retrieved Date: Mar. 21, 2011, pp. 4.

Graham-Cumming, John., "Software Builds and the Virtual Time Machine", Retrieved at <<http://drdobbs.com/architecture-and-design/205917147>>, Jan. 23, 2008, pp. 3.

Slawinska, et al., "Automated Deployment Support for Parallel Distributed Computing", Retrieved at <<http://ieeexplore.ieee.org/stamp/stamp.jsp?tp=&arnumber=4135271>>, Proceedings of the 15th Euromicro International Conference on Parallel, Distributed and Network-Based Processing, Feb. 7-9, 2007, pp. 5.

Hou, et al., "ADEM: Automating Deployment and Management of Application Software on the Open Science Grid", Retrieved at <<http://ieeexplore.ieee.org/stamp/stamp.jsp?tp=&arnumber=5353083>>, Proceedings of 10th IEEE/ACM International Conference on Grid Computing, Oct. 13-15, 2009, pp. 130-137.

Xiaoshe, et al., "Research on an Automatic Deployment Mechanism of Monitor Service in Grid Environment", Retrieved at <<http://ieeexplore.ieee.org/stamp/stamp.jsp?tp=&arnumber=4031531>>, Proceedings of the Fifth International Conference on Grid and Cooperative Computing Workshops, Oct. 2006, pp. 63-70.

Merle, et al., "Open Architecture for Building Large Scale Deployment systems", Retrieved at <<http://adele.imag.fr/Les.Publications/intConferences/SERP2004Mer.pdf>>, in Proceedings of Software Engineering Research and Practice 2004, pp. 7.

"Windows Workflow Foundation", Retrieved at <<http://msdn.microsoft.com/en-us/netframework/aa663328.aspx>>, Retrieved Date: Mar. 17, 2011, p. 1.

"ExternalDataExchangeService Class", Retrieved at <<http://msdn.microsoft.com/en-us/library/system.workflow.activities.externaldataexchangeservice.aspx>>, Retrieved Date: Mar. 17, 2011, pp. 5.

U.S. Notice of Allowance dated Jul. 31, 2013 in U.S. Appl. No. 13/198,728.

U.S. Official Action dated May 30, 2013 in U.S. Appl. No. 13/197,772.

* cited by examiner

MANAGING CONTINUOUS SOFTWARE DEPLOYMENT

BACKGROUND

In some hosted computing environments, software is hosted by servers or other computing devices. When new versions, updates, or patches for the hosted software are available, the software hosted at each of the servers or other devices may need to be updated or replaced. The updating of the servers or other devices may be completed manually and can consume large amounts of resources.

Additionally, complex operations may be required to update the hosted software, since various hosted components may work together to provide the hosted software. For example, hosted software may make use of various host resources that coordinate various operations executed independently to provide the functionality associated with the hosted software. Thus, while the host resources may rely upon one another during execution of the software, each of the host resources may be updated independently.

Furthermore, because of the above-mentioned interdependencies of the host software components, the operations executed to update the hosted software may need to be executed in a particular order to properly deploy the updates. In particular, because the host resources may rely upon one another, but also may be independently updated, failures or other errors experienced in any of the software updates may jeopardize performance of the updated software. Thus, a particular component of the hosted software may be updated and verified via manually controlled processes before updating a next component of the software to attempt to ensure that performance of the hosted software is not impacted negatively. Because hosted software may evolve and may be updated at a rapid pace, these resource-intensive update processes can be difficult to accommodate.

Another challenge experienced by software developers is that if errors are experienced in the upgraded application, the application may affect the entire update process or can affect performance of the software. Rolling back upgrades in the event of errors or performance issues can be difficult in some circumstances, and may require taking the hosted software offline. Thus, rollback of the software updates can require similarly resource- and time-consuming processes. As such, errors or other performance issues experienced during or after updating hosted software can be expensive to repair and/or can seriously affect the user experience with the application.

It is with respect to these and other considerations that the disclosure made herein is presented.

SUMMARY

Concepts and technologies are described herein for managing continuous software deployment. In accordance with the concepts and technologies disclosed herein, a deployment controller manages deployment of code to one or more virtual machines executing within a data center. When code corresponding to a software update such as a patch, a version upgrade, or other software change is received, the deployment controller can indicate a workflow for managing deployment of the code. As used herein, a "workflow" includes computer-executable code for managing the deployment of the code and other processes for updating the software hosted within the data center. The workflows can include if-else statements, loops, references, and other scripts or states that are executed to complete deployment of the code. In some embodiments, completion of one operation of the workflows may be required before flow of the workflow is allowed to progress to a next operation, though this is not necessarily the case. The deployment controller can execute a workflow for checking in, verifying, and deploying the code.

The deployment controller can manage the deployment of the code from receipt of the code to deployment at the data center. In some embodiments, the code is deployed, at least in part, by using a differencing disk. The differencing disk can include data indicating changes between the software hosted by the data center and a version of software resulting from deployment of the code. The differencing disk can be determined without deploying the code, for example, by determining how an installation script is to modify the software during deployment of the code, or via other processes. The differencing disk can be linked to the disk or virtual resource hosting the software and executed collectively to provide an updated version of the software. Thus, the differencing disk can be distributed to one or more machines or other resources hosted by the data center instead of, or in addition to, distributing code corresponding to the new version of the software.

According to one aspect, code received by the deployment controller is used to produce a build virtual hard drive. The build virtual hard drive can be a copy of the existing virtual hard drive used to host the software and linked to the differencing disk, or a virtual hard drive hosting an updated version of the software. The deployment controller also is configured to build a test machine and test the build virtual hard drive. If the tested build virtual hard drive successfully completes testing, the build virtual hard drive can be distributed to the data center hosts. As noted above, the distribution of the build virtual hard drive can be accomplished via distribution of a differencing disk, if desired. If the deployed code is installed without errors, the deployment controller can perform traffic management. If errors are detected during deployment or after deployment, the update can be rolled back.

According to another aspect, the deployment controller is configured to execute the workflows to provide the functionality described herein. The deployment controller can execute workflows to manage the continuous deployment of software and/or various processes of the workflow for managing the deployment. For example, the deployment controller can execute workflows to produce the build virtual hard drive, to build a test machine for testing the build virtual hard drive, to test the build virtual hard drive, and/or to deploy the code.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
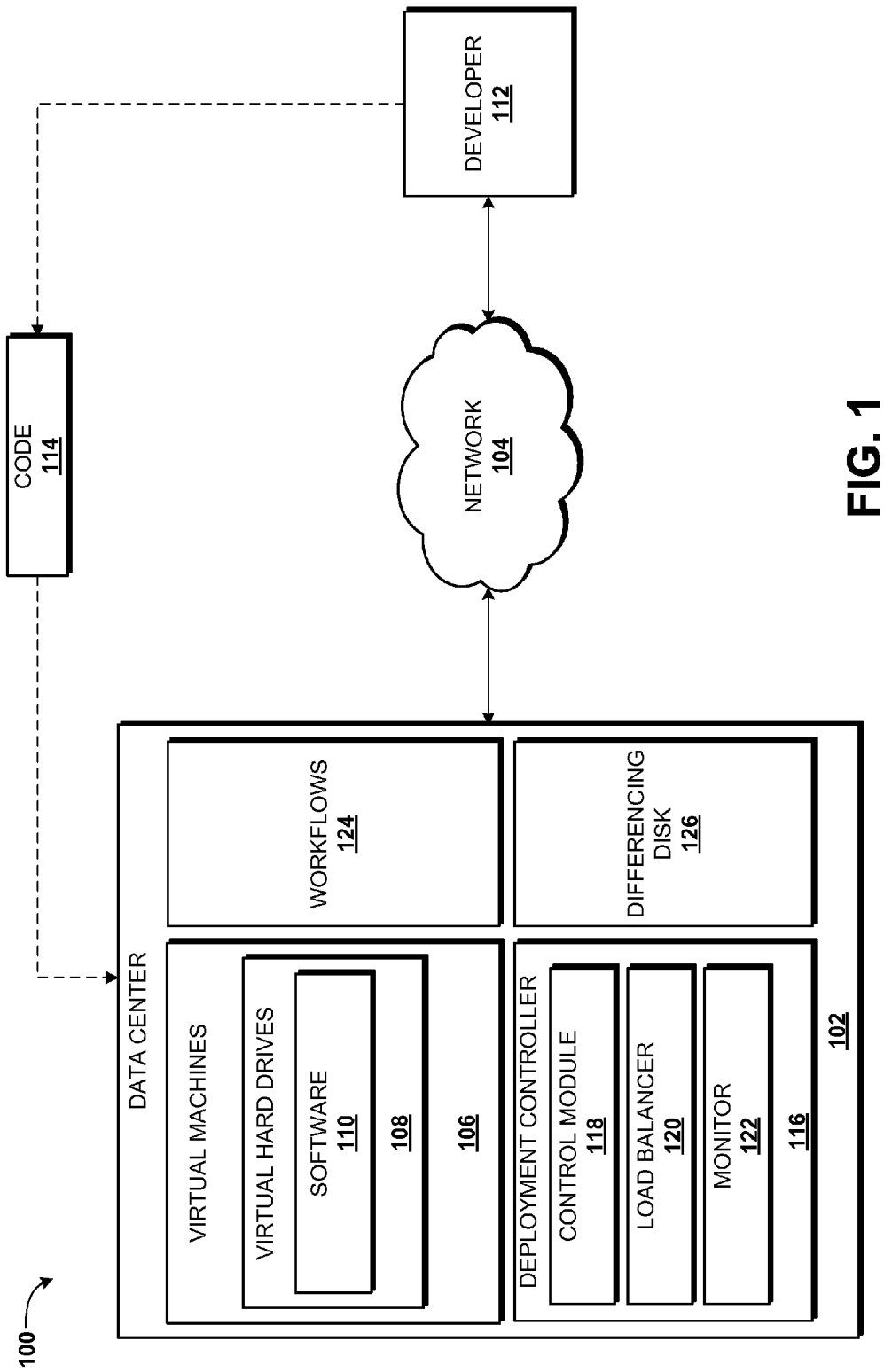
FIG. 1 is a system diagram illustrating an exemplary operating environment for the various embodiments disclosed herein.

Concepts and technologies are described herein for managing continuous software deployment. In accordance with the concepts and technologies disclosed herein, a deployment controller manages deployment of code to one or more virtual machines executing within a data center. When code corresponding to a software update such as a patch, a version upgrade, or other software change is received, the deployment controller can indicate a workflow for managing deployment of the code. The deployment controller can execute a workflow for checking in, verifying, and deploying the code, as well as other processes described herein. The deployment controller can be configured to manage the deployment of the code from receipt of the code to deployment at the data center. In some embodiments, the code is deployed, at least in part, by using a differencing disk. The differencing disk can include data indicating changes between the software hosted by the data center and a version of software resulting from deployment of the code. The differencing disk can be determined without deploying the code, for example, by determining how an installation script is to modify the software during deployment of the code, or via other processes. The differencing disk can be linked to the disk or virtual resource hosting the software and executed collectively to provide an updated version of the software. Thus, the differencing disk can be distributed to one or more machines or other resources hosted by the data center instead of, or in addition to, distributing code corresponding to the new version of the software.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for managing continuous software deployment will be presented.

Referring now to FIG. 1, aspects of one operating environment 100 for the various embodiments presented herein will be described. The operating environment 100 shown in FIG. 1 includes a data center 102 that can be configured to operate on or in communication with a network 104. The functionality of the data center 102 can be provided, in some embodiments, by one or more server computers and/or other computing resources. According to various implementations, the data center 102 hosts one or more virtual machines 106. The virtual machines 106 can include any number of associated virtual resources such as, for example, virtual hard drives 108.

In various embodiments, the data center 102 is configured to provide a hosted software environment for accessing and using functionality associated with an application program, software package, or other computer-executable code ("software") 110. As shown in FIG. 1, the software 110 can be hosted by one or more of the virtual hard drives 108 and/or the virtual machines 106. In some embodiments, the data center 102 is configured to provide functionality associated with an online collaboration software package. For example, in some embodiments, the software 110 hosted by the data center 102 corresponds to a member of the SHAREPOINT family of collaboration products available from MICROSOFT CORPORATION in Redmond, Wash. Because the data center 102 can be configured to host any desired software, application program, or other computer-executable code, it should be understood that this embodiment is illustrative, and should not be construed as being limiting in any way.

As noted above, the data center 102 can be configured to execute or otherwise provide functionality associated with the software 110 via one or more virtual machines 106 and/or virtual hard drives 108 configured to execute one or more components of the software 110. For example, in some instances, two or more aspects or components of the software 110 can be provided by two or more virtual machines 106 and/or virtual hard drives 108 hosted within the data center 102. As will be explained in more detail herein, a developer 112 can publish or release an update for the software 110 hosted by the data center 102. The update for the software can be published as a patch, software update, or other executable code ("code") 114 that is submitted to or made available to the data center 102 for deployment. As will be explained herein, the code 114 can be applied to the software 110 to update the software 110. Because the software 110 can be hosted by multiple virtual hard drives 108 and/or virtual machines 106, deploying the code 114 can include updating multiple virtual resources of the data center 102.

According to various implementations of the concepts and technologies disclosed herein, the operating environment 100 includes a deployment controller 116 to control or manage deployment and installation of the code 114, activation of an updated version of the software 110, load balancing between virtual resources hosting the software 110, monitoring of deployment progress or status, and/or to provide other functionality as described herein. The functionality of the deployment controller 116 can be provided by one or more server computers or other computing devices configured to provide the functionality described herein. In some embodiments, the deployment controller 116 is hosted by the data center 102. In other embodiments, the deployment controller 116 is hosted separately from the data center 102. Thus, the illustrated embodiment is illustrative, and should not be construed as being limited in any way.

In some embodiments, the deployment controller 116 includes or is configured to execute a control module 118, a load balancer 120, a monitor 122, and/or other devices, modules, or application programs. Although the control module 118, the load balancer 120, and the monitor 122 are illustrated as components of the deployment controller 116, it should be understood that each of these components, or combinations thereof, may be embodied as or in stand-alone devices or components operating on or in communication with the data center 102, the network 104, the developer 112, and/or the deployment controller 116. Thus, the illustrated embodiment is illustrative, and should not be construed as being limiting in any way.

The control module 118 is configured to manage and/or control the deployment processes described herein for deploying the software 110 and/or rolling back software deployment processes. In some embodiments, a new build of the software 110 is submitted, deployed, or otherwise provided to or obtained by the control module 118 as the code 114. In response to determining that a new build of the software 110 is available, the control module 118 can initiate an upgrade process.

According to various implementations described herein, the control module 118 is configured to control various aspects of a software deployment process via execution of one or more workflows 124. The workflows 124 are encoded computer-executable instructions for initiating, controlling, terminating, and/or rolling back or uninstalling a software update process. The workflows 124 can include, for example, if-else statements, loops, external references, other computer-executable code, and the like, for controlling operation of the deployment controller 116 and/or other hardware and/or software devices used to deploy or rollback software updates. In some embodiments, the workflows 124 are similar to flow diagrams, though encoded as computer-executable code. Thus, the workflows 124 can control functions of various devices, and completion of one block or operation can be required, in some embodiments, before subsequent operations are allowed to execute.

According to various implementations, the execution of the workflows 124 can be monitored by the monitor 122 or a status service, and the status of workflow 124 execution can be reported. In some implementations, the status of the various workflows 124 in progress at a particular time can be published via one or more syndicated data feeds such as an Atom Syndication Format feed or other feed format. Thus, multi-machine deployments of the code 114, rollback of the deployments, and/or the status of the deployments or rollbacks can be tracked. The workflow 124 instances can be persisted in a cache for quick retrieval and/or stored in a database or other data storage location if idle for a period of time that exceeds some specified threshold such as five seconds, ten seconds, one minute, one hour, one day, or the like. Some illustrative workflows 124 and the implementation and monitoring of workflow execution are described in more detail herein, particularly with reference to FIGS. 2-7.

According to various embodiments, the control module 118 is configured to issue commands to and receive information from the load balancer 118 and/or the monitor 122. Thus, the control module 118 can be configured to control load balancing functions of the deployment controller 116 and/or to obtain monitoring information relating to the data center 102, as will be explained herein in more detail with reference to FIGS. 2-7.

The load balancer 118 is configured to control routing of traffic to the data center 102 and/or to or among one or more virtual machines 106 and/or virtual hard drives hosted by the data center 102. For example, the load balancer 118 can route traffic to a first virtual machine 106 hosting an upgraded version of the software 110 for testing and/or for other purposes. As will be explained in more detail below, if errors are detected in operation of the upgraded version of the software 110, the load balancer 118 may reroute traffic from the first virtual machine 106 to a second virtual machine 106 hosting another version of the software 110 so a rollback process can be provided. These and other functionality associated with the load balancer 118 are described in more detail herein.

The monitor 122 is configured to monitor execution of the workflows 124 and to monitor performance of the data center 102 and/or one or more virtual machines 106 and/or virtual hard drives 108 hosting the software 110. As mentioned above, the monitor 122 also can be configured to monitor and report execution status of any workflow 124 instances at a particular time, for example, via a data feed or other appropriate mechanism. In some embodiments, the monitor 122 can be used to determine if the upgraded version of the software 110 functions correctly or incorrectly and/or to determine if errors are experienced during deployment of the code 114. In some embodiments, a rollback process can be initiated if the monitor 122 determines that the upgraded version of the software 110 is not performing correctly and/or if errors are identified during a deployment process.

The data center 102 also can generate, store, and/or host a differencing disk 126. The differencing disk 126 is a data file that identifies changes made to the software 110 by the code 114. Thus, the differencing disk 126 can, alone or in combination with data corresponding to the software 110, be used to collectively represent a new version of the software 110. In some embodiments, the deployment controller 116 is configured to generate the differencing disk 126 during compiling, verification, or other processes that can be performed upon receipt of the code 114. Use of the differencing disk 126 during deployment of the code 114 will be described in more detail herein with reference to FIGS. 2-7.

FIG. 1 illustrates one data center 102, one network 104, and one developer 112. It should be understood, however, that some implementations of the operating environment 100 include multiple data centers 102, multiple networks 104, and/or multiple developers 112. Thus, the illustrated embodiments should be understood as being illustrative, and should not be construed as being limiting in any way.

Figure 2:
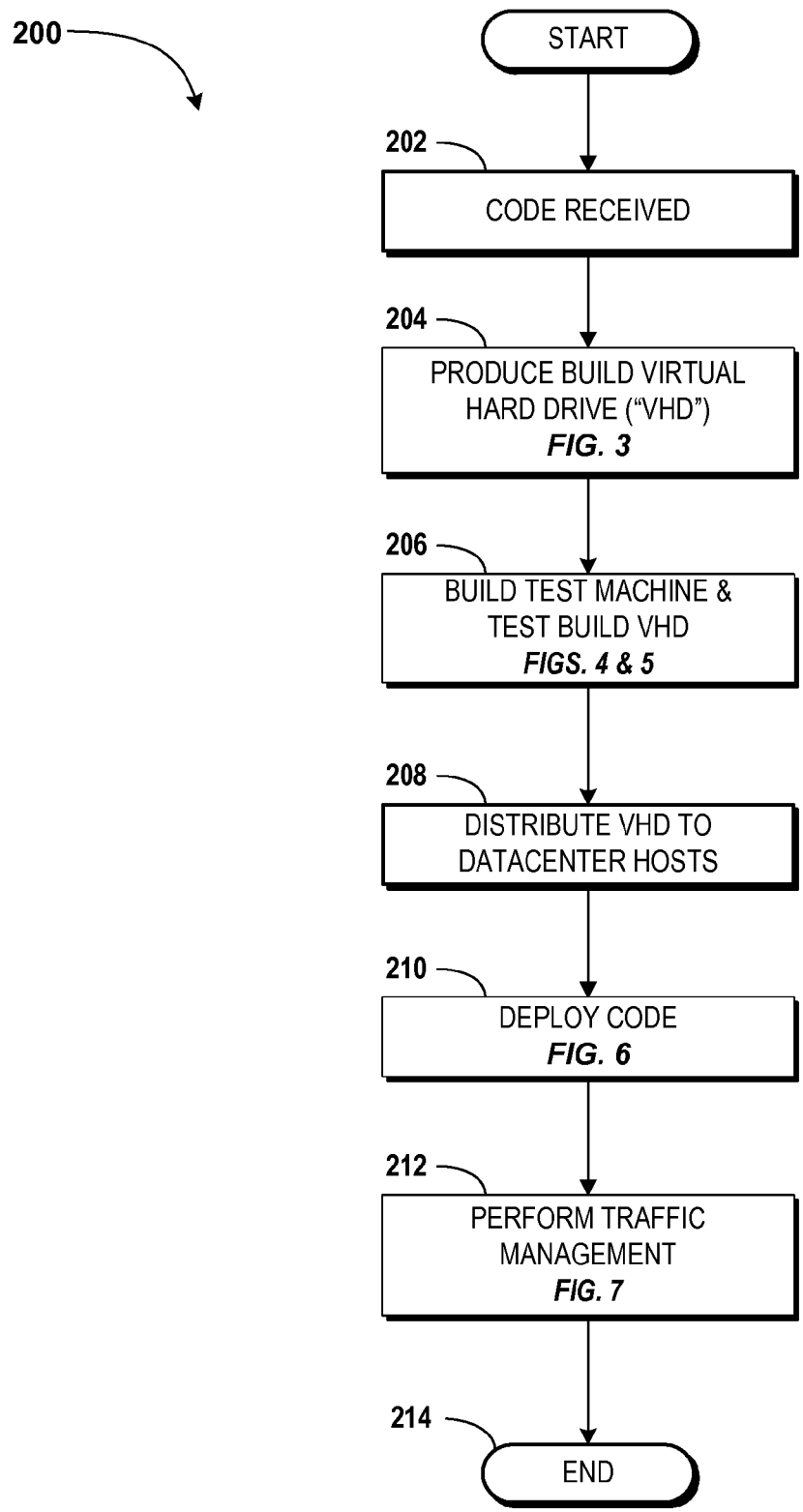
FIG. 2 is a flow diagram showing aspects of a method for deploying software, according to an illustrative embodiment.

Turning now to FIG. 2, aspects of a method 200 for deploying software will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the deployment controller 116. It should be understood that these embodiments are exemplary, and should not be viewed as being limiting in any way. For example, other modules or components of the data center 102 or other devices or entities can provide the functionality described herein. The method 200 begins at operation 202, wherein code 114 corresponding to a new version or build of the software 110 is received at the deployment controller 116. As noted above, the deployment controller 116 can execute on or as part of the data center 102. As such, the code 114 may be received at the data center 102. In some embodiments, the code 114 is received at the deployment controller 116 in response to a developer 112 submitting the code 114 for deployment or publication. It should be understood that this embodiment is illustrative, and should not be construed as being limiting in any way.

Although not illustrated in FIG. 2, it should be understood that the deployment controller 116 can be configured to perform any number of code verification processes in addition to the other functionality described herein. For example, the deployment controller 116 or a component thereof can register the submitted code 114 with a code check-in application or device, compile the code 114, correct any errors detected in the code 114 during compiling, prepare an installation script or package for installing the code 114, validate the code 114 and/or the developer 112, and/or perform verification steps not illustrated herein. The deployment controller 116 also can be configured to determine the contents of and create the differencing disk 126, as explained above.

From operation 202, the method 200 proceeds to operation 204, wherein the deployment controller 116 creates a virtual hard drive 108 for hosting the new version of the software 110, or components thereof, (hereinafter referred to as a "build virtual hard drive 108"). In some embodiments, the deployment controller 116 executes a workflow 124 to create the build virtual hard drive 108. Additional details of an illustrative workflow 124 for producing the build virtual hard drive 108 are described in more detail below with reference to FIG. 3.

From operation 204, the method 200 proceeds to operation 206, wherein the deployment controller 116 tests the build virtual hard drive 108 created in operation 204. In some embodiments, the deployment controller 116 executes a workflow 124 to setup a test machine for testing the build virtual hard drive 108. The deployment controller 116 also can execute another workflow 124 for running a test job on the test machine. Additional details of illustrative workflows 124 for setting up a test machine for testing the build virtual hard drive 108 and for running a test job on the test machine are described in more detail below with reference to FIGS. 6 and 7, respectively. If the build virtual hard drive 108 successfully passes the tests referred to in operation 206, the method 200 proceeds to operation 208.

In operation 208, the deployment controller 116 distributes the build virtual hard drive 108 to the virtual machines 106 of the data center 102. In some embodiments, the differencing disk 126 is distributed and linked to a virtual hard drive 108 hosting an existing version of the software 110 instead of, or in addition to, distributing a virtual hard drive 108 hosting a new version of the software 110. From operation 208, the method 200 proceeds to operation 210, wherein the deployment controller 116 deploys the code 114 at the virtual machines 106 of the data center 102. In some embodiments, the deployment controller 116 executes a workflow 124 to deploy the code 114 and/or the differencing disk 126 to/at the virtual machines 106 of the data center 102. An illustrative workflow 124 for deploying the code 114 is described below with reference to FIG. 4.

From operation 210, the method 200 proceeds to operation 212, wherein the deployment controller 116 performs traffic management. In some embodiments, the load balancer 120 provides the traffic management described herein. Additional details of traffic management are described below with reference to FIG. 7. From operation 212, the method 200 proceeds to operation 214. The method 200 ends at operation 214.

Figure 3:
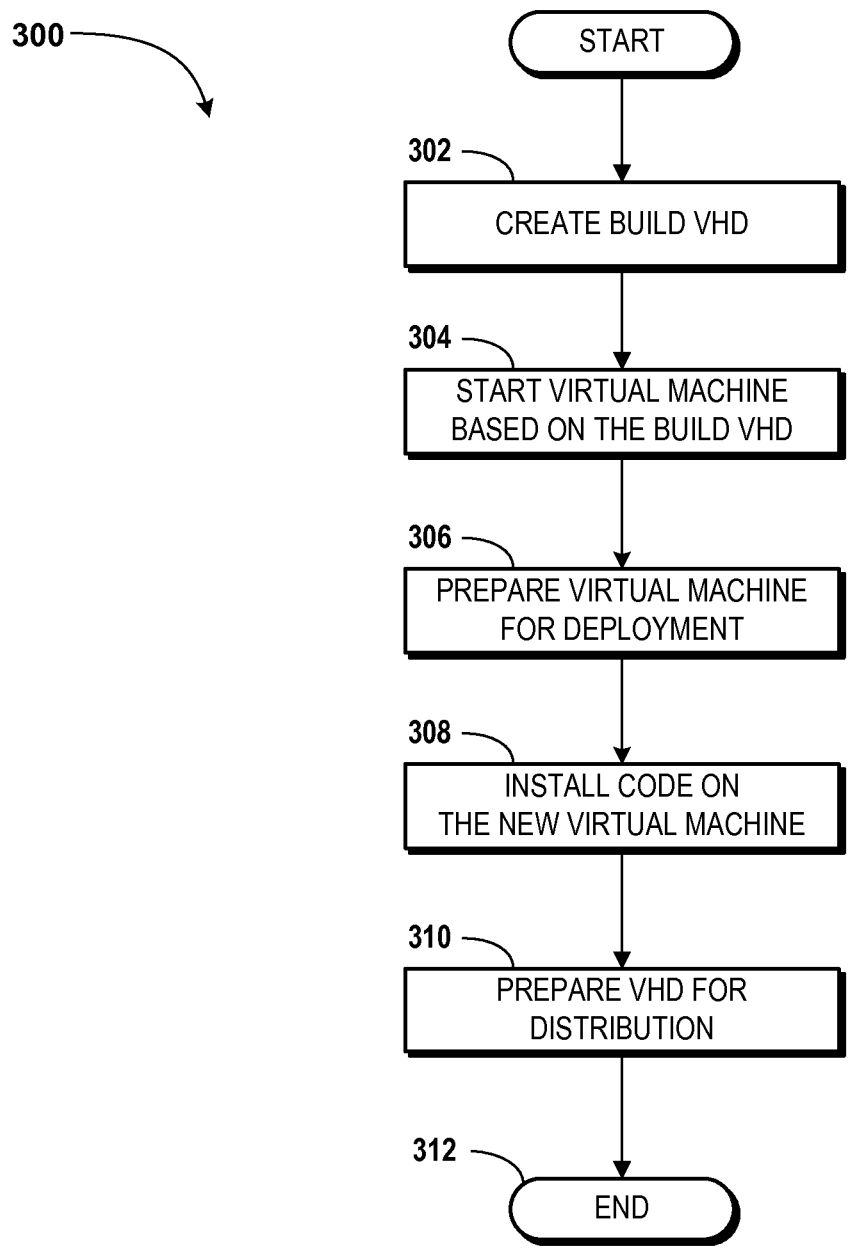
FIG. 3 is a flow diagram showing aspects of a method for producing a build virtual hard drive for deployment of the code, according to an illustrative embodiment.

Turning now to FIG. 3, aspects of a method 300 for producing a software build for deployment will be described in detail. As noted above with reference to FIG. 2, the operations described herein with reference to FIG. 3 can correspond to execution of a workflow 124 by the deployment controller 116 at operation 204 of the method 200. It should be understood that this embodiment is illustrative, and should not be construed as being limiting in any way.

The method 300 begins at operation 302, wherein the deployment controller 116 creates a new virtual hard drive for the build. In operation 302, the deployment controller 116 can determine if the data center 102 has disk space to accommodate creation of the a new virtual hard drive 108. Files can be deleted, if needed, to create the disk space needed to accommodate the new virtual hard drive 108. Operation 302 also can include creation of a differencing disk 126 based upon the software 110 executed by the data center 102. As noted above, the differencing disk 126 can indicate differences between hosted software 110 and a software build that will exist after deployment of the code 114. In some embodiments, the differencing disk 126 is used in conjunction with a virtual hard drive 108 hosting a current version of the software 110 to obtain the new version of the software 110, as will be explained in more detail below with reference to FIG. 6. In operation 302, the deployment controller 116 can generate the differencing disk 126 based upon the existing software 110 and the code 114, if desired.

From operation 302, the method 300 proceeds to operation 304, wherein the deployment controller 116 starts a new virtual machine 106. The new virtual machine 106 started in operation 304 can be based upon the virtual hard drive 108 created in operation 302. It can be appreciated that the new virtual machine 106 also can be based upon an existing virtual hard drive 108 hosting an existing version of the software 110 and the differencing disk 126 described herein. In operation 304 the deployment controller 116 shuts down the virtual machine 106 running the previous version of the software 110. A virtual hard drive 108 hosting the previous version of the software 110 can be detached from the virtual machine 106, and a new virtual hard drive 108 is attached to the virtual machine 106. The new virtual machine 106 is started, and the deployment controller 116 determines if the new virtual machine 106 is operating correctly. In some embodiments, for example, the deployment controller 116 determines if an operating system is running on the new virtual machine 106. It should be understood that other approaches for evaluating execution of the new virtual machine 106 are possible. Thus, this embodiment is illustrative, and should not be construed as being limiting in any way. If the new virtual machine 106 is operating correctly, the virtual machine 106 is available for the next operation of the method 300.

From operation 304, the method 300 proceeds to operation 306, wherein the deployment controller 116 prepares the virtual machine 106 created in operation 304 for deployment of the code 114. In one embodiment, the deployment controller 116 sets a password on a first boot drive of the virtual machine 106 and sets a machine name and domain within the data center 102 for the new virtual machine 106. The virtual machine 106 is restarted, and the deployment controller 116 determines if the virtual machine 106 is operating correctly. In some embodiments, the deployment controller 116 determines if the virtual machine 106 is running an operating system and any other services to be used for the virtual machine 106. Some illustrative services that may be used by the virtual machine 106 include, but are not limited to, structured query language ("SQL") services, Internet information services ("IIS"), SHAREPOINT components, and/or other services. The deployment controller 116 installs updates, if any, for the services or software installed on the virtual machine 106 and also can perform post-setup configuration steps such as registration, restarting the virtual machines 106, and the like.

From operation 306, the method 300 proceeds to operation 308, wherein the deployment controller 116 installs the code 114 corresponding to the new version of the software 110 on the new virtual machine 106. In some embodiments, operation 308 includes deploying or making available the differencing disk 126 and instructions for linking the differencing disk 126 to a virtual hard drive 108 hosting a current version of the software 110. In operation 308, the deployment controller 116 installs the code 114 to obtain the updated version of the software 110. The deployment controller 116 also activates the updated version of the software 110 to activate any new features added or modified by the code 114. After installing and activating the code 114 or the differencing disk 126, the deployment controller 116 performs post-setup configuration steps and tests to ensure that the code 114 or the differencing disk 126 is functioning. For example, the deployment controller 116 can execute functionality tests and warm up procedures to catch any detectable flaws in the code 114. If no errors are generated in operation 308, or if any correctable flaws in the code 114, if any, are corrected, the method 300 can proceed to operation 310.

In operation 310, the deployment controller 116 prepares the virtual hard drive 108 for distribution. As noted above, operation 310 also or alternatively can include preparing the differencing disk 126 for distribution. In operation 310, the deployment controller 116 detaches the virtual hard drive 108 from the virtual machine 106 and copies the virtual hard drive 108 to a file server or other data storage service or device. In some embodiments, the virtual hard drive 108 is stored at the data center 102. In some embodiments, the deployment controller 116 also is configured to log into the virtual machine 106, create answers files or other information, and shut down the virtual hard drive 108 before detaching the virtual hard drive 108 from the virtual machine 106. From operation 310, the method 300 proceeds to operation 312. The method 300 ends at operation 312.

Figure 4:
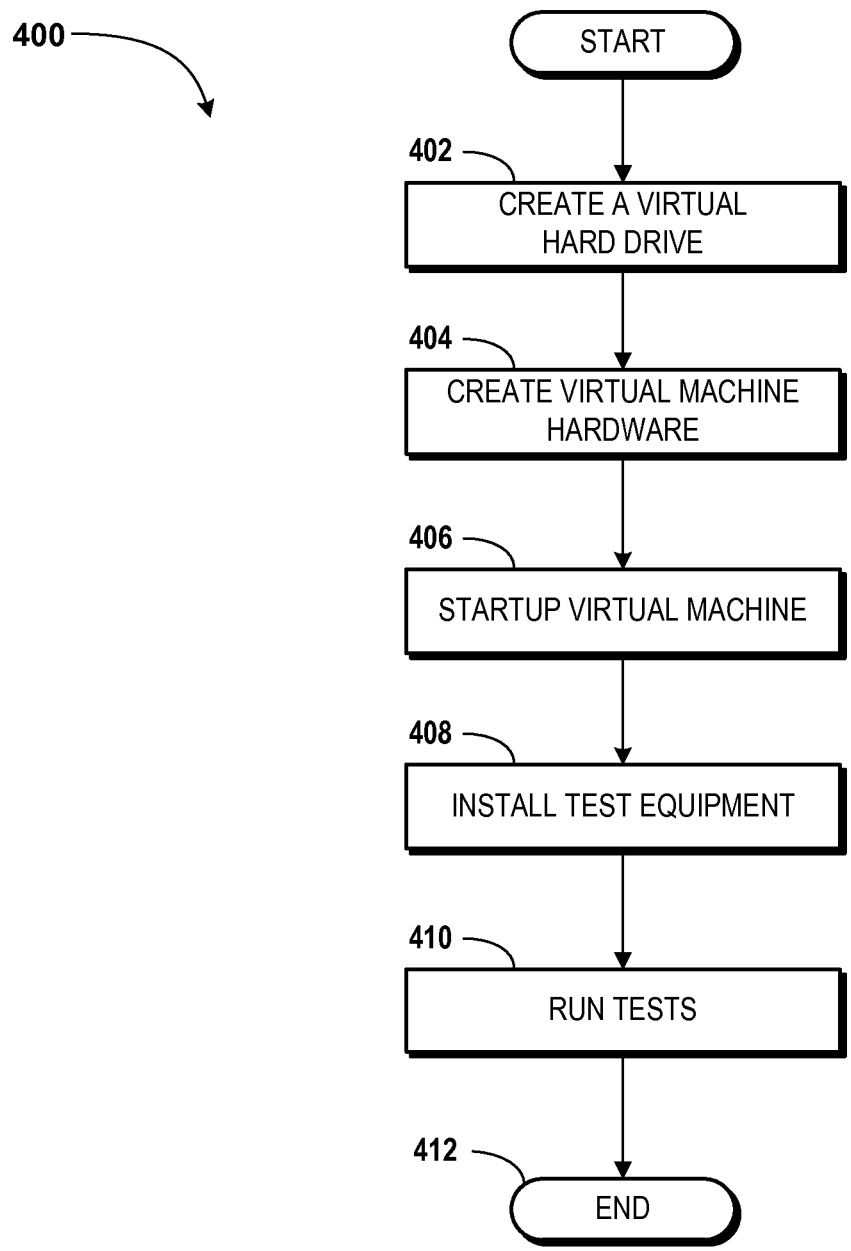
FIG. 4 is a flow diagram showing aspects of a method for building a test machine for testing the build virtual hard drive, according to an illustrative embodiment.

Turning now to FIG. 4, aspects of a method 400 for building a test machine 106 will be described in detail. As noted above with reference to FIG. 2, the operations described herein with reference to FIG. 4 can correspond to execution of a workflow 124 by the deployment controller 116 at operation 206 of the method 200. It should be understood that this embodiment is illustrative, and should not be construed as being limiting in any way. The method 400 begins at operation 402, wherein the deployment controller 116 creates a virtual hard drive 108. In some embodiments, the deployment controller 116 verifies that disk space is available for the virtual hard drive 108. If there is not enough disk space available, the deployment controller 116 can delete files or take other actions to obtain an amount of disk space needed for the virtual hard drive 108.

From operation 402, the method 400 proceeds to operation 404, wherein the deployment controller 116 creates the virtual machine 106 and any associated resources. For example, the deployment controller 116 can create the virtual machine 106 hardware for hosting or testing software 110. From operation 404, the method 400 proceeds to operation 406, wherein the deployment controller 116 starts the virtual machine 106 created in operation 404.

From operation 406, the method 400 proceeds to operation 408, wherein the deployment controller 116 installs test equipment on the virtual machine 106. The test equipment can include test software, test harnesses, and/or other utilities used for testing the software 110 and/or the virtual machines 106 or virtual hard drives 108 hosting the software 110. In some embodiments, the deployment controller 116 executes one or more test software setup scripts to install the test equipment. It should be understood that this embodiment is illustrative, and should not be construed as being limiting in any way.

From operation 408, the method 400 proceeds to operation 410, wherein the deployment controller 116 executes tests on the virtual machine 106. An illustrative workflow 124 for executing a test job is described below with reference to FIG. 5. When the tests are completed, or at any other time during execution of the method 400, the deployment controller 116 can shut down the virtual machine 106. From operation 410, the method 400 proceeds to operation 412. The method 400 ends at operation 412.

Figure 5:
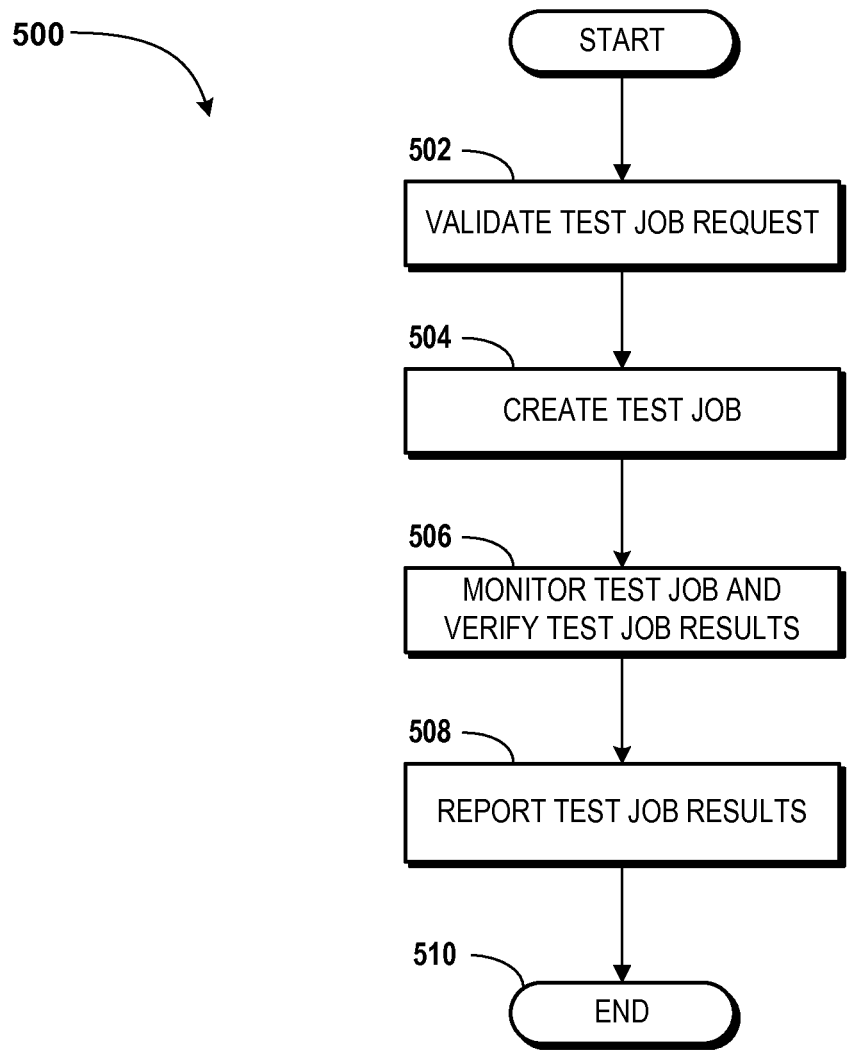
FIG. 5 is a flow diagram showing aspects of a method for executing a test of the build virtual hard drive, according to an illustrative embodiment.

Turning now to FIG. 5, aspects of a method 500 for testing a build virtual hard drive 108 will be described in detail. As noted above with reference to FIG. 2, the operations described herein with reference to FIG. 5 can correspond to execution of a workflow 124 by the deployment controller 116 at operation 204 of the method 200. It should be understood that this embodiment is illustrative, and should not be construed as being limiting in any way. The method 500 begins at operation 502, wherein the deployment controller 116 validates a test job request received by the deployment controller 116.

According to various implementations, the deployment controller 116 ensures that the test job request has been received from a valid source, and/or that the test job request is formatted properly, denoting that the test job request is valid. For example, in some embodiments, the test job requests are reviewed to ensure that the request specifies at least one build virtual machine 106 to execute the tests on, as well as an indication such as a keyword for selecting or indicating one or more tests to run. If the test job request is determined to be valid, the method 500 proceeds to operation 504.

At operation 504, the deployment controller 116 creates the test job in accordance with the test job request received in operation 502. From operation 504, the method 500 proceeds to operation 506, wherein the deployment controller 116 monitors the test job and verifies the test job results. Although not shown in FIG. 5, it should be understood that the deployment controller 116 can periodically check the test job status. Once the test job has completed or the execution of the test job has timed out, the deployment controller 116 reviews the test job results.

From operation 506, the method 500 proceeds to operation 508, wherein the test job results are reported. In some embodiments, the deployment controller 116 receives the test job results, which may be reported by any hardware or software configured to monitor execution of the test job. In other embodiments, the deployment controller 116 monitors the test job and can be configured to report the test job results to one or more modules or components of the deployment controller 116, or to use the test job results to determine if the test job has successfully executed. From operation 508, the method 500 proceeds to operation 510, wherein the method 500 ends.

Figure 6:
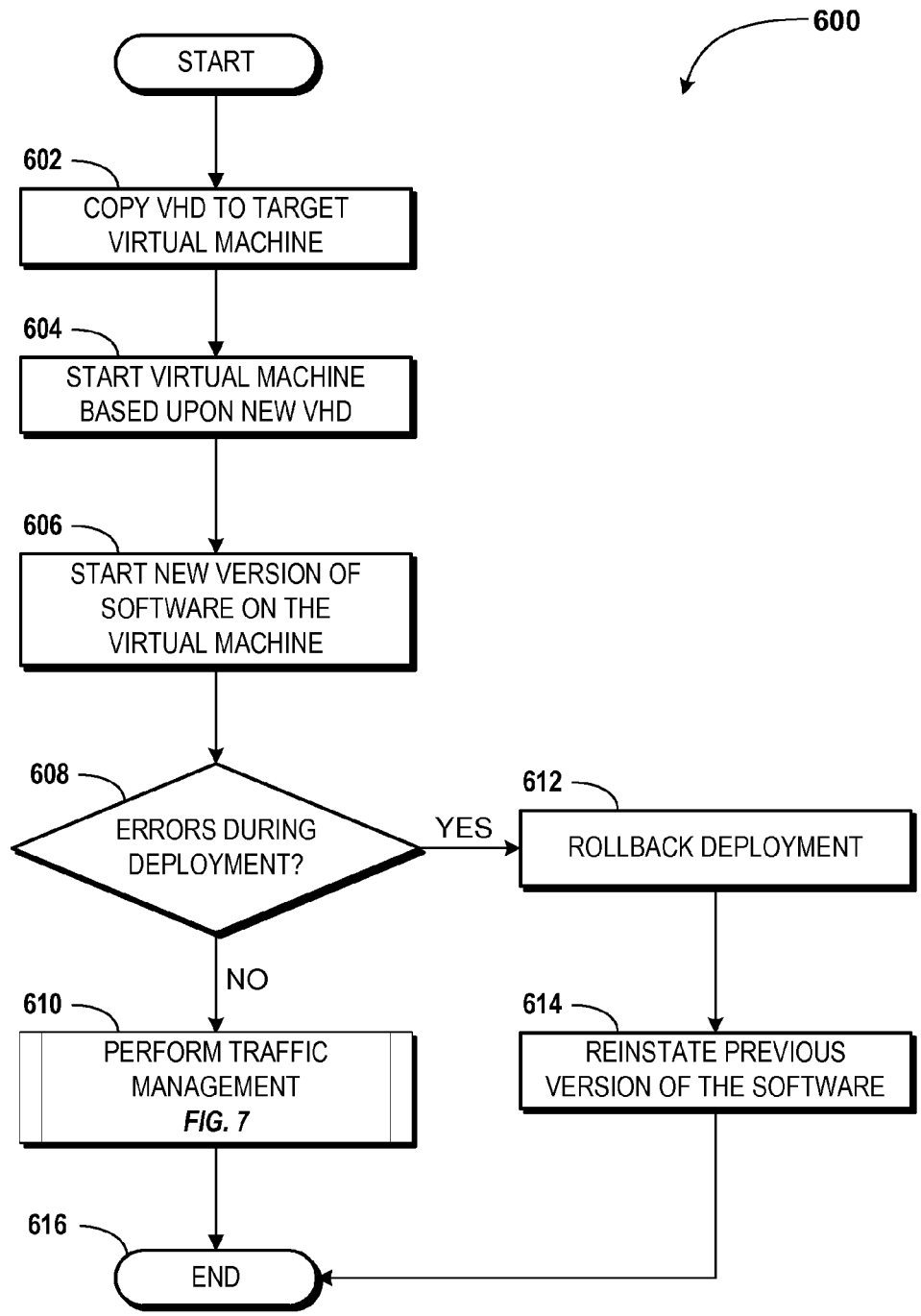
FIG. 6 is a flow diagram showing aspects of a method for deploying the code, according to an illustrative embodiment.

Turning now to FIG. 6, aspects of a method 600 for deploying the code 114 will be described in detail. As noted above with reference to FIG. 2, the operations described herein with reference to FIG. 6 can correspond to execution of a workflow 124 by the deployment controller 116 at operation 210 of the method 200. The method 600 begins at operation 602, wherein the deployment controller 116 copies the virtual hard drive 108 prepared for distribution in operation 310 above to a target virtual machine 106. As noted above, the differencing disk 126 can be deployed in some embodiments. Operation 602 includes, in some embodiments, checking the target virtual machine 106 to determine if the target virtual machine 106 has sufficient disk space to host the data corresponding to the virtual hard drive 108. If the deployment controller 116 determines that sufficient disk space is not available, the deployment controller 116 can delete files or take other steps to obtain the amount of disk space needed. The virtual hard drive 108 is copied to the target virtual machine 106. It should be understood that copying the virtual hard drive 108 to the target virtual machine 106 can be a lengthy process.

From operation 602, the method 600 proceeds to operation 604, wherein the deployment controller 116 starts the new virtual machine 106 based upon the copied virtual hard drive 108. Operation 604 can include shutting down the previous virtual hard drive 108 and detaching the previous virtual hard drive 108 from the virtual machine 106. The new virtual hard drive 108 can be linked to the parent disk on the local virtual machine 108, and a new virtual hard drive 108 can be attached to the virtual machine 106. The new virtual machine 106 is started and the deployment controller 116 determines if the new virtual machine 106 is operating correctly. In some embodiments, the deployment controller 116 determines if an operating system is running on the new virtual machine 106, though other operations can be executed to determine if the new virtual machine 106 is operating correctly. If the virtual machine 106 is operating correctly, the method 600 proceeds to operation 606.

As noted above, some embodiments of the concepts and technologies disclosed herein include using a differencing disk 126 in conjunction with a virtual hard drive 108 hosting the existing version of the software 110. Thus, in some embodiments, operation 604 includes linking the differencing disk 126 to the parent disk or another virtual hard drive 108 hosting the existing version of the software 110. The virtual machine 106 can execute the virtual hard drive 108 hosting the existing version of the software 110 in conjunction with the differencing disk 126, thereby providing the updated version of the software 110 without installing the new version of the software 110 in its entirety. Thus, some embodiments of the concepts and technologies disclosed herein allow the new version of the software 110 to be executed while maintaining a working version of the software 110 at the data center 102.

It can be appreciated that by using a differencing disk 126, some embodiments of the concepts and technologies disclosed herein allow rollback of the code 114 by simply de-linking the differencing disk 126 to the parent disk or a virtual hard drive 108 hosting the previous version of the software 110. Similarly, the changes to the software 110 can be rapidly rolled out by copying the differencing disk 126 instead of copying virtual hard drives 108 embodying a full updated version of the software 110 as otherwise may be required. The differencing disk 126 can consume less storage space than a virtual hard disk 108 storing a full version of the software 108. Thus, some embodiments of the concepts and technologies disclosed herein enable conservation of bandwidth and storage space during deployment of the code 114 and/or enable rapid rollback of the software 110 in the event of errors or performance degradation.

At operation 606, the deployment controller 116 starts the build service on the virtual machine 106. As such, in operation 606, the deployment controller 116 can start the new version of the software 110. In some embodiments, operation 606 includes setting a password for a boot drive of the virtual machine 106, setting the machine name and domain for the virtual machine 106, restarting the virtual machine 106 and determining if the virtual machine 106 is functioning correctly. In some embodiments, the deployment controller 116 determines if the virtual machine 106 is functioning correctly by determining if an operating system is operating on the virtual machine 106. It should be understood that this embodiment is illustrative, and should not be construed as being limiting in any way.

Additionally, operation 606 includes, in some embodiments, installing services on the virtual machine 106, as explained above with reference to operation 306 of FIG. 3. The started virtual machine 106 can be tested to determine if the virtual machine 106 is operating correctly. If the started virtual machine 106 is operating correctly, the deployment controller 116 can determine that the new version of the software 110 is available.

From operation 606, the method 600 proceeds to operation 608, wherein the deployment controller 116 determines if any errors have been identified during deployment or starting up of the virtual machine 106. It should be understood that the functionality of operation 608 can be performed substantially continuously during execution of the workflow 124 corresponding to the method 600. Thus, errors can be detected by the deployment controller 116 at any time during execution of the method 600, if desired.

If, at operation 608, the deployment controller 116 determines that errors were not detected during deployment, the method 600 proceeds to operation 610, wherein the deployment controller 116 performs traffic management, as will be described in more detail below with reference to FIG. 7. Although not shown in FIG. 6, the deployment controller 116 can register the new virtual machine 106 hosting the new version of the software 110 with the load balancer 120 and the monitor 122. During registration, the deployment controller 116 can identify the new virtual machine 106 as hosting one version of the software 110 so the load balancer 120 or another traffic controller can route users to an appropriate virtual machine 106.

If, at operation 608, the deployment controller 116 determines that errors are detected during deployment, the method 600 proceeds to operation 612. At operation 612, the deployment controller 116 initiates a rollback of the deployment. At operation 612, the virtual machine 106 hosting the new version of the software 110 can be stopped, or the virtual hard drive 108 corresponding to build virtual hard drive 108 can be stopped. From operation 612, the method 600 proceeds to operation 614, wherein the deployment controller 116 can reinstate the previous version of the software 110, if desired. As can be appreciated from the description of the differencing disk 126 herein, operation 614 can include de-linking the differencing disk 126 from a virtual hard drive 108 hosting an existing version of the software 110, if desired. From operation 614 and/or from operation 610, the method 600 proceeds to operation 616. The method 600 ends at operation 616.

Figure 7:
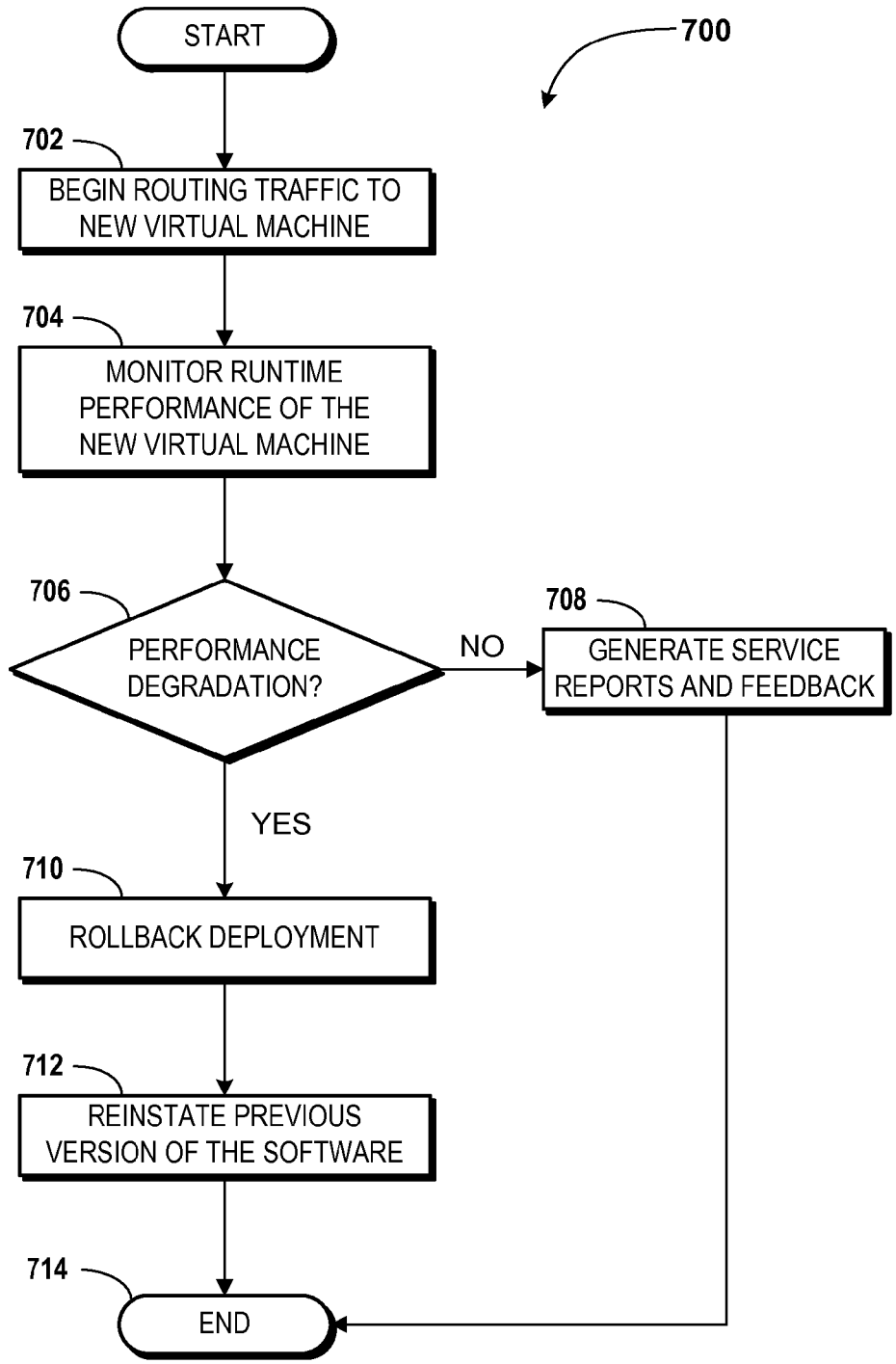
FIG. 7 is a flow diagram showing aspects of a method for managing traffic for a new version of the software, according to an illustrative embodiment.

Turning now to FIG. 7, aspects of a method 700 for managing traffic for a new software build will be described in detail. As noted above with reference to FIGS. 2 and 6, the operations described herein with reference to FIG. 7 can correspond to the traffic management referenced in operation 212 of the method 200 and/or operation 610 of the method 600. While the method 700 is described as being performed by the deployment controller 116, it is to be understood that the load balancer 120 and/or the monitor 122 can be used to provide some, all, or none of the functionality described herein with reference to FIG. 7.

The method 700 begins at operation 702, wherein the deployment controller 116 begins routing traffic to the new virtual machine 106. As noted above with reference to operation 610 of the method 600, the deployment controller 116 can register the new virtual machine 106 with a load balancer 120 and/or a monitor 122 to inform the load balancer 120 and/or the monitor 122 that load is to be shifted between two or more virtual machines 106 hosting two or more versions of the software 110, if desired.

From operation 702, the method 700 proceeds to operation 704, wherein the deployment controller 116 initiates monitoring of runtime performance of the new virtual machine 106 to identify any performance degradation or errors. From operation 704, the method 700 proceeds to operation 706, wherein the deployment controller 116 determines if any performance degradation or errors are detected during runtime performance of the new virtual machine 106.

If the deployment controller 116 determines at operation 706 that no performance degradation or errors are detected in performance of the virtual machine 106, the method 700 proceeds to operation 708, wherein the deployment controller 116 generates service reports and feedback to report the performance. If the deployment controller 116 determines at operation 706 that performance degradation has been experienced, the method 700 proceeds to operation 710, wherein the deployment controller 116 rolls back the deployment, as explained above with regard to operation 612 of the method 600. From operation 710, the method 700 proceeds to operation 712, wherein the deployment controller 116 can reinstate the previous version of the software 110, if desired, as noted above with reference to operation 612 of the method 600. From operations 712 and 708, the method 700 proceeds to operation 714, where the method 700 ends.

Figure 8:
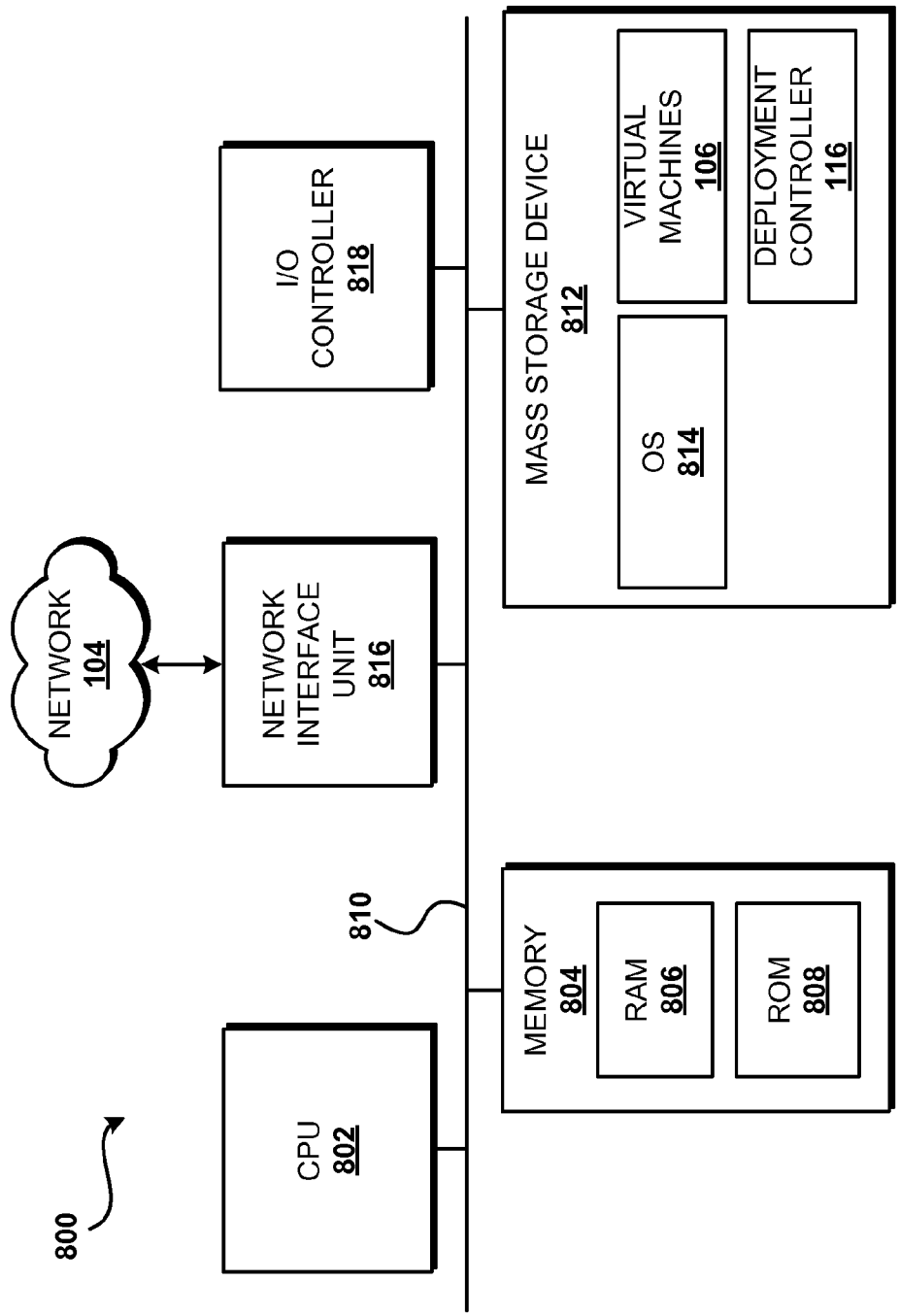
FIG. 8 is a computer architecture diagram illustrating an exemplary computer hardware and software architecture for a computing system capable of implementing aspects of the embodiments presented herein.

FIG. 8 illustrates an exemplary computer architecture 800 for a device capable of executing the software components described herein for managing continuous software deployment. Thus, the computer architecture 800 illustrated in FIG. 8 illustrates an architecture for a server computer, a desktop computer, a netbook computer, a tablet computer, a laptop computer, and/or another computing device. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing the operating system 814, the deployment controller 116 and the virtual machines 106. Although not shown in FIG. 8, the mass storage device 812 also can be configured to store the workflows 124 and the differencing disk 126, as well as the various components of the deployment controller 116 and the virtual machines 106 described above, if desired.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium" and variations thereof, does not include waves, signals, and/or other transitory and/or intangible communication media, per se.

According to various embodiments, the computer architecture 800 may operate in a networked environment using logical connections to remote computers through a network such as the network 104. The computer architecture 800 may connect to the network 104 through a network interface unit 816 connected to the bus 810. It should be appreciated that the network interface unit 816 also may be utilized to connect to other types of networks and remote computer systems. The computer architecture 800 also may include an input/output controller 818 for receiving and processing input from a number of other devices, including a keyboard, mouse, or electronic stylus (not shown in FIG. 8). Similarly, the input/output controller 818 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Based on the foregoing, it should be appreciated that technologies for managing continuous software deployment have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for deploying code, the computer-implemented method comprising performing computer-implemented operations for:
   receiving the code, the code corresponding to an update for software hosted by a data center;
   producing a build virtual hard drive comprising data for updating the software, wherein producing the build virtual hard drive further comprises
      creating a build virtual hard drive,
      preparing a new virtual machine for deployment,
      installing the code on the new virtual machine, wherein new virtual machine comprises,
         creating a differencing disk comprising data indicating a difference between a first version of the software and a second version of the software based upon the code,
         linking the differencing disk to a virtual hard drive on which the software is hosted,
      starting a virtual machine based upon the build virtual hard drive, and
      preparing the virtual hard drive for distribution;
   deploying the build virtual hard drive at the data center;
   performing traffic management to manage traffic to one or more virtual hard drives hosted by the data center;
   determining if a performance degradation is detected; and
   if a performance degradation is detected, rerouting the traffic of at least one of the virtual hard drives to prepare for a rollback deployment.

2. The method of claim 1, wherein deploying the code comprises:
   copying the virtual hard drive to a target virtual machine;
   starting the target virtual machine;
   determining if errors are detected during execution of the target virtual machine; and
   in response to determining that errors are detected, rolling back deployment of the code by de-linking the differencing disk from the virtual hard drive.

3. The method of claim 1, wherein deploying the code comprises:
   copying the virtual hard drive to a target virtual machine;
   starting the target virtual machine;
   determining if errors are detected during execution of the target virtual machine; and
   in response to determining that errors are detected, rolling back deployment of the code.

4. The method of claim 3, further comprising in response to determining that errors are not detected, managing traffic associated with the target virtual machine.

5. The method of claim 4, wherein managing the traffic comprises:
routing traffic to the new virtual machine;
monitoring runtime performance of the new virtual machine; and
in response to detecting performance degradation, rolling back deployment of the code.

6. The method of claim 5, wherein managing the traffic further comprises reinstating a previous version of the software.

7. The method of claim 4, wherein managing the traffic further comprises in response to not detecting performance degradation, generating a service report.

8. The method of claim 1, wherein at least one of producing the build virtual hard drive or deploying the virtual hard drive comprises executing a workflow stored at a data center.

9. The method of claim 8, further comprising:
monitoring execution of the workflow; and
reporting an execution status of the workflow.

10. A computer-implemented method for deploying code at a data center, the computer-implemented method comprising performing computer-implemented operations for:
receiving the code at the data center, the code corresponding to an update for software hosted by the data center;
producing a build virtual hard drive comprising data for updating the software hosted by the data center, wherein producing the build virtual hard drive comprises executing a workflow at the data center for
creating a build virtual hard drive,
preparing a virtual machine for deployment,
installing the code on the new virtual machine, wherein installing the code on the new virtual machine comprises
creating a differencing disk comprising data indicating a difference between a first version of the software and a second version of the software based upon the code,
linking the differencing disk to a virtual hard drive on which he software is hosted,
starting the new virtual ac n the new virtual machine being based upon the build virtual hard drive, and
preparing the virtual hard drive for distribution to the one or more virtual hard drives;
deploying the build virtual hard drive on at least one virtual machine hosted by the data center;
performing traffic management to manage traffic to one or more virtual hard drives hosted by the data center;
determining if a performance degradation is detected; and
if a performance degradation is detected, rerouting the traffic of at least one of the virtual hard drives to prepare for a rollback deployment.

11. The method of claim 10, wherein deploying the code comprises:
copying the virtual hard drive to a target virtual machine;
starting the target virtual machine;
determining if errors are detected during execution of the target virtual machine;
in response to determining that errors are detected, rolling back deployment of the code by de-linking the differencing disk from the virtual hard drive; and
in response to determining that no errors are detected, performing the traffic management.

12. The method of claim 11, wherein managing the traffic comprises:
routing traffic to the new virtual machine;
monitoring runtime performance of the new virtual machine; and
in response to detecting performance degradation, rolling back deployment of the code.

13. A computer storage medium having computer readable instructions stored thereupon that, when executed by a computer, cause the computer to:
receive the code at the data center, the code corresponding to an update for software hosted by the data center, the update comprising at least one of a patch for the software or an upgrade for the software;
produce a build virtual hard drive comprising computer-executable code for updating the software hosted by the data center, wherein producing the build virtual hard drive further comprise instructions for executing a workflow to
create a build virtual hard drive,
prepare a virtual machine for deployment,
install the code on the new virtual machine,
create a differencing disk comprising data indicating a difference between a first version of the software and a second version of the software based upon the code,
link the differencing disk to a virtual hard drive on which the software is hosted,
start the new virtual machine, the new virtual machine being based upon the build virtual hard drive, and
prepare the virtual hard drive for distribution to the one or more virtual hard drives:
utilize the differencing disk to deploy the build virtual hard drive on at least one virtual machine hosted by the data center;
perform traffic management to manage traffic to one or more virtual hard drives hosted by the data center;
determine if a performance degradation is detected; and
if a performance degradation is detected, reroute the traffic of at least one of the virtual hard drives to prepare for a rollback deployment.

* * * * *